J. LIESKOVAN.
PORTABLE VEHICLE TURN TABLE.
APPLICATION FILED JUNE 11, 1914.

1,124,628.

Patented Jan. 12, 1915.

Witnesses
M. B. Kovalik
Bryant

Inventor
J. Lieskovan
A. M. Wilson
Attorney

UNITED STATES PATENT OFFICE.

JOSEPH LIESKOVAN, OF BACH, MICHIGAN.

PORTABLE VEHICLE TURN-TABLE.

1,124,628.　　　　Specification of Letters Patent.　　Patented Jan. 12, 1915.

Application filed June 11, 1914. Serial No. 844,483.

*To all whom it may concern:*

Be it known that I, JOSEPH LIESKOVAN, a subject of the Emperor of Austria-Hungary, residing at Bach, in the county of Huron and State of Michigan, have invented certain new and useful Improvements in Portable Vehicle Turn-Tables, of which the following is a specification.

This invention relates to new and useful improvements in portable vehicle turn tables.

The primary object of this invention is to provide a turn table device carried upon a vehicle and whereby the vehicle may be readily turned around in any desired direction in the smallest possible space.

A further object is to provide an automobile with a device for elevating the vehicle above the ground and in which position the same may be pivotally revolved to any desired direction and is adaptable for turning a vehicle in a narrow roadway or other location where there is insufficient room for driving the vehicle around the desired turn.

A still further object is to provide an elevating turn table upon the floor of a vehicle and operable from the driver's seat thereof and whereby the vehicle may be readily elevated and turned as desired.

With these general objects in view and others that will appear as the nature of the invention is better understood, the same consists in the novel combination and arrangement of parts hereinafter fully described, illustrated in the accompanying drawings and pointed out in the appended claims.

Figure 1:
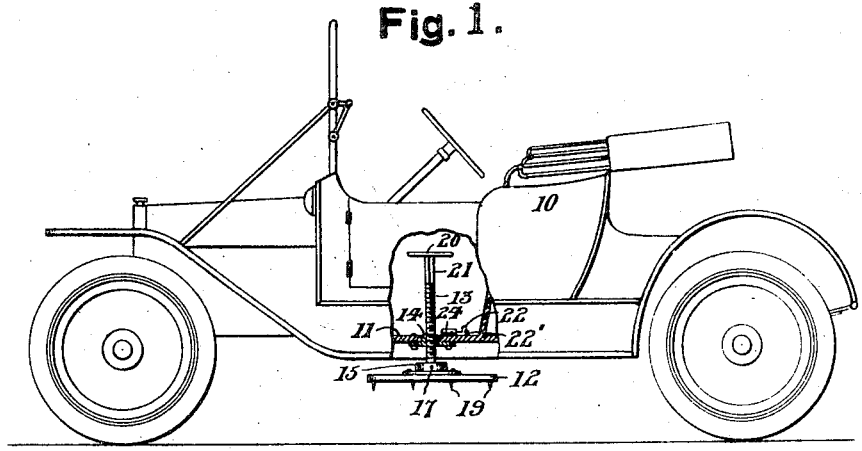
Figure 2:
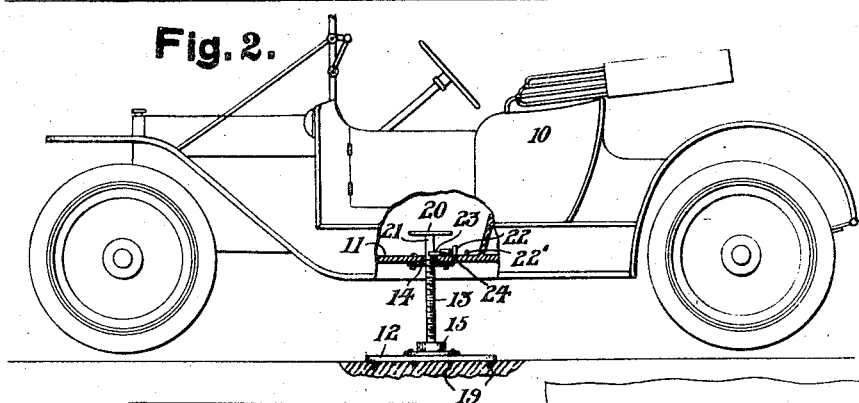
Figure 3:
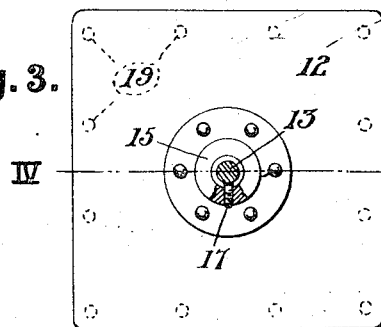
Figure 5:
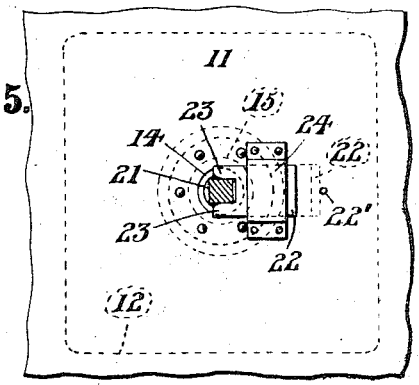
Figure 4:
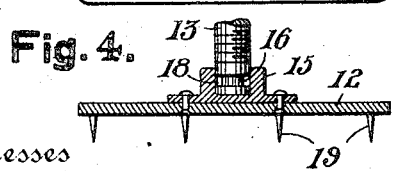

In the drawings forming a part of this application and in which like designating characters refer to corresponding parts throughout the several views:—Figure 1 is a side elevation of an automobile partially broken away illustrating the device employed thereon and in its inoperative position. Fig. 2 is a similar view with the automobile elevated upon the device. Fig. 3 is a top plan view of the turn table base partly broken away and the shaft thereof shown in section. Fig. 4 is a vertical transverse sectional view taken upon line IV—IV of Fig. 3, and Fig. 5 is a top plan view of a portion of the automobile floor with the turn table shaft shown in section.

Referring more in detail to the drawings, the device it will be understood is applicable to any form of vehicle but is herein illustrated in connection with an automobile 10 and carried by the floor 11 thereof.

The turn table proper consists of a base plate 12 swiveled to the lower end of an operating rod 13 which is externally screw-threaded and is threaded through the perforated plate 14 secured to the bottom 11 of the vehicle. The swiveled connection between the base 12 and the rod 13 consists of a central bracket 15 carried by the base and having an inner socket 16 for the reception of the lower end of the rod and carrying a screw 17 which extends into the annular groove 18 of said rod end. The base 12 is provided with sharpened spikes 19 upon its lower surface and it will be evident that by revolving the rod 13 through the agency of its turn wheel 20 secured to the top of said rod that the said base plate is lowered from the position shown in Fig. 1 to contact with the ground as illustrated in Fig. 2, thus projecting the spikes 19 into the road-bed and elevating the automobile upon the rod by continued turning of the said rod 13.

The upper portion of the operating rod is squared as at 21 and a sliding latch 22 is carried by the automobile floor and provided with a U-shaped notch 23 in the end thereof adapted to engage this squared portion of the rod for preventing any further relative movement between the rod and automobile floor when the vehicle has been elevated a sufficient height to clear the roadbed and at which time the squared portion of the rod is positioned so as to be readily engaged by the latch.

The latch 22 is slidably mounted within a strap or loop 24 upon the vehicle bottom 11 while the length of the operating rod is made of proper length for the vehicle upon which it is installed so as to only elevate the same the proper distance when lowering the base plate to its operative position. A limit stop pin 22' is provided for the latch 22.

The complete operation of the device will be apparent from this detailed description in that a turning of the wheel 20 revolves the rod 13 and lowers the same to position the base plate 12 upon the road-way and the spikes 19 into the surface thereof and whereupon a continued turning of the rod within its swiveled connection with the base plate elevates the automobile upon said rod sufficiently to clear the vehicle wheels from the road-way and to position the squared portion 21 of the rod to be contacted by the latch 22 when slidably moved inwardly. Upon this locking of the rod by the latch against relative movement with respect to the vehicle floor, the vehicle may be readily swung around upon said rod as a pivot and upon the swivel connection between said rod and the base plate, which latter remains stationary. When the vehicle is positioned as desired, the latch 22 may be removed and upon holding the vehicle stationary the wheel 20 may be turned for lowering the vehicle to a position upon the roadway and thereafter for elevating the rod and base plate to its inoperative position as illustrated in Fig. 1. By this arrangement it will be apparent that a serviceable ready device is provided upon the vehicle whereby the vehicle may be turned around as desired.

While the forms of the invention herein shown and described are what are believed to be preferable embodiments thereof, it is nevertheless to be understood that minor changes may be made in the form, proportion and details of construction without departing from the spirit and scope of the invention as set forth in the appended claims.

What I claim as new is:—

1. A device of the class described comprising a plate having a threaded perforation therethrough secured to the floor of the vehicle, an operating rod screw-threaded in said perforation, a base plate swiveled to the lower end of said rod, a sliding latch carried by the vehicle floor and having a U-shaped notch in one end thereof adapted for engaging the squared upper portion of said rod when the base plate is in its lowered operative position.

2. A device of the class described comprising a vehicle floor having a threaded perforation therethrough, an operating rod screw-threaded through said perforation and having a squared upper portion, a base plate swiveled to the lower end of said rod and a turn wheel rigidly secured to the upper end thereof, ground engaging spikes upon the lower face of said base plate, a strap secured to the upper surface of said floor, a sliding latch positioned within said strap and having a U-shaped notch in its free end in alinement with said rod and adapted for spanning the squared portion thereof when the base plate is in its operative lowermost position.

In testimony whereof I affix my signature in presence of witnesses.

JOSEPH X LIESKOVAN.
his mark

Witnesses:
P. F. WERSCHKY,
ANDY GONDA,
S. R. PARK.